United States Patent [19]

Maehara et al.

[11] Patent Number: 4,870,517
[45] Date of Patent: Sep. 26, 1989

[54] MAGNETIC TAPE CASSETTE LOADING MECHANISM IN RECORDING AND/OR REPRODUCING APPARATUS

[75] Inventors: Masanori Maehara, Kanagawa; Takao Kumagai, Tokyo; Shuji Yoshida, Saitama; Manabu Tsuyama, Tokyo, all of Japan

[73] Assignee: Sony Corporation, Tokyo, Japan

[21] Appl. No.: 143,933

[22] Filed: Jan. 14, 1988

[30] Foreign Application Priority Data

Jan. 21, 1987 [JP] Japan ................................ 62-011892

[51] Int. Cl.⁴ ............................................ G11B 15/00
[52] U.S. Cl. ..................................... 360/96.5; 360/93
[58] Field of Search ................... 360/96.5, 85, 93, 95, 360/96.1, 96.6

[56] References Cited

U.S. PATENT DOCUMENTS

| 4,641,210 | 2/1987 | Ohyama | 360/96.5 |
| 4,706,141 | 11/1987 | Oha et al. | 360/96.5 |

FOREIGN PATENT DOCUMENTS

| 0035712 | 3/1984 | Japan | 360/96.5 |
| 0171070 | 9/1984 | Japan | 360/96.5 |

*Primary Examiner*—Stuart N. Hecker
*Assistant Examiner*—David J. Severn
*Attorney, Agent, or Firm*—Ronald P. Kananen

[57] ABSTRACT

A cassette loading mechanism for loading a magnetic tape cassette, which has a front pivotal closure member openable for covering or exposing a front opening of the magnetic tape cassette, in a recording and/or reproducing apparatus includes a cassette holder which is movable between an eject position, at which the cassette can be inserted into or removed from the cassette holder, a lowered position vertically offset from the eject position, and a loaded position horizontally offset from said lowered position and at which cassette loading is completed. The upper portion of the cassette holder is covered with a cassette holder lid which has a recessed portion so that the front pivotal closure member may be moved to open in synchronism with movement of the cassette holder from the eject position to the lowered position. The cassette holder lid and the cassette holder are moved in unison.

15 Claims, 1 Drawing Sheet

MAGNETIC TAPE CASSETTE LOADING MECHANISM IN RECORDING AND/OR REPRODUCING APPARATUS

BACKGROUND OF THE INVENTION

1. FIELD OF THE INVENTION

The present invention relates generally to a loading mechanism for loading a magnetic tape cassette in a recording and/or reproducing apparatus. More particularly, the invention relates to an automatic loading mechanism in a recording and/or reproducing apparatus designed for use with a magnetic tape cassette having a front pivotal closure lid openable for covering or exposing the front opening of the magnetic tape cassette.

2. DESCRIPTION OF THE BACKGROUND ART

A tape cassette which has a magnetic tape serving as a recording medium is loaded in a recording and/or reproducing apparatus at a predetermined position by means of a loading system in order to perform recording and/or reproduction.

Japanese patent application (Tokugan) Showa No. 60-113782 (U.S. Ser. No. 214,827), which is assigned to the same assignee to the present invention, discloses a loading mechanism for loading a magnetic tape cassette, which has a front pivotal closure member openable for covering or exposing a front opening of said magnetic tape cassette, in the apparatus at a predetermined position. This mechanism comprises an inner cassette holder supporting the magnetic tape cassette thereon, an outer cassette holder for receiving and holding the inner cassette holder within an inner-holder receptacle defined therein, and a sliding means for allowing the inner cassette holder to move horizontally. The front end of the outer cassette holder is pivotably connected to a cabinet of the apparatus so that the outer cassette holder can be moved between an inclined, eject position, at which the magnetic tape cassette can be inserted into or removed from the inner cassette holder, and a preparing position, at which the inner cassette holder is held horizontally therein. After the magnetic cassette is inserted into the inner cassette holder at the eject position, the outer holder is moved from the eject position to the preparing position. Thereafter, the magnetic tape cassette is moved horizontally from the preparing position to a loaded position, at which cassette loading is completed. This mechanism further includes means for actuating the front pivotal closure member from a closed position, at which the front opening is covered with the front pivotal member, to an open position, at which the front opening is open, in synchronism with movement of the outer cassette holder from the eject position to the preparing position. In order to permit pivotal movement of the front pivotal closure member, there is sufficient space between the upper surface of the magnetic tape cassette and the upper wall of the outer cassette holder. In this mechanism, although the magnetic tape cassette and the inner cassette holder are moved horizontally in unison, the outer cassette holder is not. Therefore, the space between the magnetic tape cassette and the outer cassette holder must be relatively large to accommodate the horizontal movement of the inner cassette holder therein.

SUMMARY OF THE INVENTION

It is therefore an principal object of the present invention to provide a magnetic tape cassette loading mechanism for a recording and/or reproducing apparatus, in which the space between the magnetic tape cassette and the cassette holder for permitting pivotal movement of the front pivotal closure member is relatively small.

It is another object of the invention to provide a compact loading mechanism for loading a magnetic tape cassette in a recording and/or reproducing apparatus.

In order to accomplish the aforementioned and other specific objects, the magnetic tape cassette loading mechanism, according to the present invention, includes holding means for receiving and holding the magnetic tape cassette within a cassette receptacle defined therein. The holding means is movable between an eject position, at which the cassette can be inserted into and removed from the holding means, a lowered position vertically offset from the eject position, and a loaded position horizontally offset from the lowered position and at which cassette loading is completed. The vertical and horizontal movements of the holding means are respectively performed by means of lifting and sliding means. The loading mechanism of the invention can load a magnetic tape cassette, which has a front pivotal closure member openable for covering or exposing a front opening of the magnetic tape cassette, in the recording and/or reproducing apparatus. The loading mechanism further includes means, associated with the holding means, for actuating the front pivotal closure member from a closed position, at which the front opening is covered with the front pivotal closure member, to an open position, at which the front is open, in synchronism with movement of the holding means from the eject position to the lowered position.

According to one aspect of the present invention, the cassette loading mechanism comprises:

holding means for receiving and holding the magnetic tape cassette at a fixed position within a cassette receptacle defined therein, said holding means being movable between an eject position, at which the magnetic tape cassette can be inserted into and removed from the holding means, and a loaded position at which cassette loading is completed;

lifting means for causing the holding means and the magnetic tape cassette to move in unison in an essentially vertical direction between the eject position and a lowered position;

sliding means for causing the holding means and the magnetic tape cassette to move in unison in an essentially horizontal direction between the lowered position and the loaded position; and first means, associated with the holding means, for actuating the front pivotal closure member from a closed position, at which the front opening is covered with the front pivotal closure member, to an open position, at which the front opening is open, in synchronism with movement of the holding means from the eject position to the lowered position.

Preferably, the holding means comprises a first member, on which the magnetic tape cassette is supported, and second member which covers the upper surface of the magnetic tape cassette, the second member being fixed to the first member to form the cassette receptacle between the first and second members. The second member may be composed of a plate portion and a recessed portion fixed to an edge of the plate portion so that the recessed portion may receive the front pivotal closure member therein at the open position thereof. The sliding means may comprise a stationary member fixed to a cabinet of the recording and/or reproducing apparatus, and a sliding member which is slidable on the stationary member in an essentially horizontal direction. The lifting means may comprise an elongated linking member, one end of which is pivotably connected to the sliding member and the other end of which is pivotably connected to the holding means. The first means may include a horizontally projecting member fixed to the sliding member, which thrusts the front pivotal closure member up in synchronism with movement of the holding means from the eject position to the lowered position so as to allow the front pivotal closure member to open. The second member of the holding means is preferably composed of front and rear plate portions and a recessed portion connected between the front and rear plate portions so that the recessed portion may receive said front pivotal closure member therein at the open position thereof. The cabinet may include an upper plate portion which extends horizontally and is arranged so as to overlap with the front plate portion at the loaded position of the holding means.

According to another aspect of the invention, the loading mechanism comprises:

holding means for receiving and holding the magnetic tape cassette within a cassette receptacle defined therein, the cassette holding means being movable between a first position, at which the cassette receptacle is exposed for insertion and removal of the magnetic tape cassette, a second position vertically offset from the first position, and a third position horizontally offset from the second position and at which cassette loading is completed;

first means, associated with the holding means, for driving the holding means between the first and second positions;

second means, associated with the holding means, for driving the holding means between the second and third positions;

third means, associated with the holding means, for allowing the front pivotal closure member to be moved from a closed position, at which the front opening is closed to be covered with the front pivotal closure member, to an open position, at which the front opening is open, in synchronism with movement of the holding means from the first position to second position; and fourth means, associated with the holding means, for covering the magnetic tape cassette and for receiving the front pivotal closure member at the open position thereof.

The holding means may comprise a first member, on which the magnetic tape cassette is supported, and the fourth means may comprise a second member fixed to the first member to form the cassette receptacle between the first and second members, the first and second members being moved in unison between the first, second and third positions of the holding means. The second member is preferably formed with a recessed portion which receives the front pivotal closure member of the magnetic tape cassette at the open position thereof. The second means may comprise a stationary member fixed to a cabinet of the recording and/or reproducing apparatus, and a sliding member which is slidable on the stationary member in an essentially horizontal direction. The first means may comprise an elongated linking member, one end of which is pivotably connected to the sliding member and the other end of which is pivotably connected to the holding means. The third means may include a horizontally projecting member fixed to the sliding member, which allows an edge of the front pivotal closure member to move upwards in synchronism with movement of the holding means from the first position to the second position so as to make the front pivotal closure member open.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to this specific embodiment, but are for explanation and understanding only.

In the drawings.

DETAILED DESCRIPTION OF THE PREFERRED EMBODIMENT

The preferred embodiment of a loading mechanism for loading a magnetic tape cassette in a recording and/or reproducing apparatus, according to the present invention, will be described herebelow.

Figure 1:
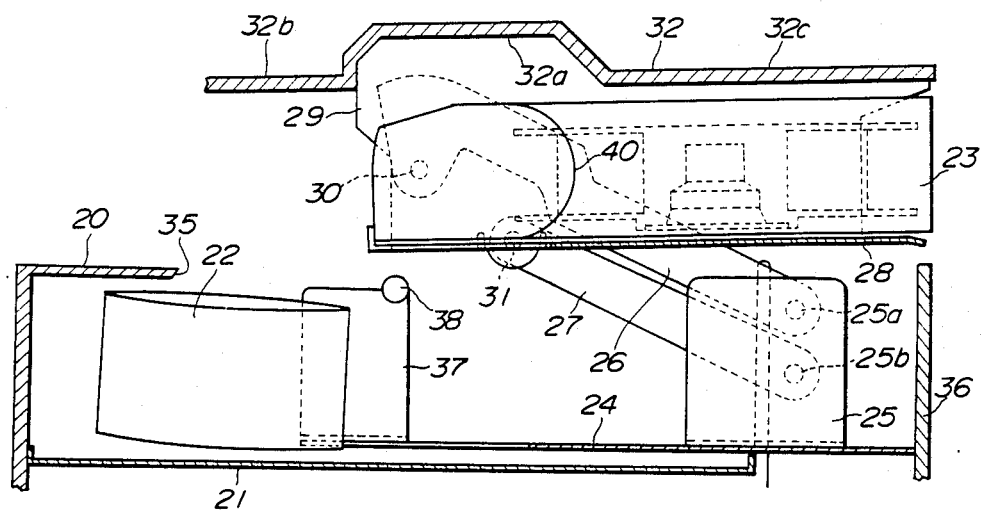
FIG. 1 is a cross section of the preferred embodiment of a magnetic tape cassette loading mechanism for a recording and/or reproducing apparatus, according to the present invention, at the eject position.
Figure 2:
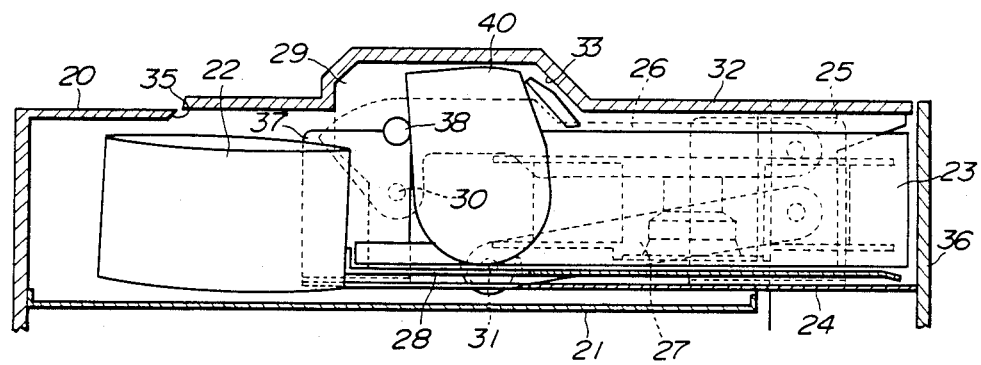
FIG. 2 is a cross section of the mechanism of FIG. 1 at the lowered position vertically offset from the eject position.
Figure 3:
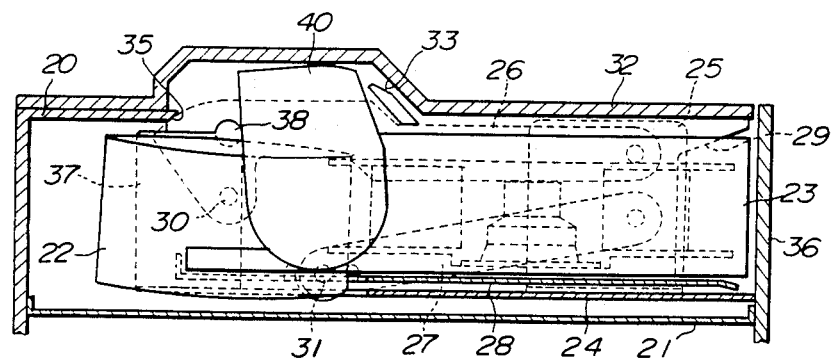
FIG. 3 is a cross section of the mechanism of FIG. 1 at the loading position horizontally offset from the lowered position shown in FIG. 2.

Referring now to the drawings, particularly to FIGS. 1 to 3, the cassette loading mechanism comprises an essentially U-shaped cross-section cassette holder 28 which receives a magnetic tape cassette 23, an essentially rectangular sliding chassis 24 which supports the cassette holder 28 by means of elongated links 26 and 27, and an essentially rectangular main chassis 21 which slidably supports the sliding chassis 24. The cassette holder 28 is designed to receive the magnetic tape cassette 23 and to carry it between an eject position shown in FIG. 1, at which the cassette 23 can be picked up, and a loaded position shown in FIG. 3, at which recording and/or reproduction may be performed.

The front edge of the main chassis 21 is connected to a L-shaped cross-section cabinet 20, which comprises a vertically extending wall and a horizontally extending wall, so as to be perpendicular to the vertically extending wall of the cabinet 20. The sliding chassis 24 is supported on the main chassis 21 so as to be slidable in a horizontal direction. The rear edge of the sliding chassis 24 is connected to a vertically extending panel 36. A box-shaped loading portion having an essentially rectangular opening 35 at the top thereof is formed by the cabinet 20, main chassis 21, sliding chassis 24 and panel 36.

A essentially cylindrical rotary head drum 22 is mounted near the front edge of the main chassis 21.

Front and rear side walls 37 and 25 extend vertically from the front and rear portions of the both side edges of the sliding chassis 24. Each of the front side walls 37 is provided with a pin 38 extending perpendicular to the front side walls 37. Each of the rear side walls 25 of the sliding chassis 24 is provided with upper and lower pins or projecting portions 25a and 25b extending perpendicular to the rear side walls 25. The upper and lower projecting portions 25a and 25b are respectively connected to ends of the elongated links 26 and 27 so that the elongated links 26 and 27 are pivotable about the corresponding projecting portions 25a and 25b. The other ends of the links 26 and 27 support the cassette holder 28 which has vertically extending side walls 29. A pair of pins 30 and 31 protrude perpendicularly from each of the side walls 29 of the cassette holder 28 and the respective links 26 and 27 are arranged so as to be pivotable about the pins 30 and 31. The upper portion of the cassette holder 28 is covered by a cassette holder lid 32. The magnetic tape cassette 23 may be housed in a space defined by the cassette holder 28 and the cassette holder lid 32. As is well known, the magnetic tape cassette 23 is usually provided with a front pivotal closure lid 40 which covers the front opening of the magnetic tape cassette 23 to protect the magnetic tape wound onto reel hubs of the magnetic tape cassette 23 when it is not in use. The front pivotal closure lid 40 is pivotably supported by the cassette casing at points near the front edge thereof and can open upwards to expose the magnetic tape when the tape cassette is loaded in the recording and/or reproducing apparatus. The cassette holder lid 32 is formed with a recessed portion 32a so as not to obstruct the upward movement of the front pivotal closure lid 40 of the magnetic tape cassette 23. That is, the cassette holder lid 32 comprises the recessed portion 32a and front and rear plate portions 32b and 32c. According to the present invention, the front pivotal closure lid 40 of the cassette casing 23 may be opened by means of the pin 38 in accordance with the downward movement of the cassette holder 28.

With this construction, the magnetic tape cassette 23 is, at first, inserted into the space between the cassette holder 28 and the cassette holder lid 32 at the eject position shown in FIG. 1. Thereafter, when the cassette holder 28 is depressed, it is moved downwardly in accordance with rotation of the links 26 and 27. As a result, the upper opening 35 of the loading portion is closed by the cassette holder lid 32 as shown in FIG. 2. At this position, the front edge of the front plate portion 32b is slightly shifted from the edge of the horizontally extending portion of the cabinet 20 so that the front plate portion 32b overlaps the horizontally extending portion of the cabinet 20 at the loading position shown in FIG. 3. In accordance with the downward movement of the cassette holder 28, the front pivotal closure lid 40 is thrusted upwards by means of the pins 38 mounted on the front side walls 37 of the sliding chassis 24, so that the cassette lid 40 opens.

Thereafter, the sliding chassis 24 is moved horizontally from the position shown in FIG. 2 to that shown in FIG. 3. In accordance with the horizontal movement of the sliding chassis 24, the cassette holder 28 connected to the rear side walls 25 by means of the links 26 and 27, the cassette holder lid 32 connected to the cassette holder 28 and the magnetic tape cassette 23 supported by the cassette holder 28 are moved. As a result, the rotary head drum 22 is inserted into a recessed portion formed on the magnetic tape cassette 23 at the front end thereof, so that the magnetic tape is held against the rotary head drum 22. A part of the magnetic tape is wound onto the rotary head drum 22 so that recording and/or reproduction is performed.

According to the present invention, the magnetic tape cassette 23 is moved together with not only the cassette holder 28 but also the cassette holder lid 32. Therefore, there is no sliding movement between the magnetic tape cassette 23 and the cassette holder lid 32. Accordingly, the recessed portion 32a may be smaller than that of conventional apparatus. As a result, the recording and/or reproducing apparatus may be more compact.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A cassette loading mechanism in a recording and/or reproducing apparatus for a magnetic tape cassette which has a front pivotal closure member openable for covering or exposing a front opening of said magnetic tape cassette, which cassette loading mechanism comprises:

holding means for receiving and holding said magnetic tape cassette at a fixed position within a cassette receptacle defined therein, said holding means being movable between an eject position, at which said magnetic tape cassette can be inserted into and removed from said holding means, and a loaded position at which cassette loading is completed, said holding means comprising a first member, on which said magnetic tape cassette is supported, and a second member which covers the upper surface of said magnetic tape cassette, said second member being fixed to said first member to form said cassette receptacle between said first and second members;

lifting means for causing said holding means and said magnetic tape cassette to move in unison in an essentially vertical direction between said eject position and a lowered position;

sliding means for causing said holding means and said magnetic tape cassette to move in unison in an essentially horizontal direction between said lowered position and said loaded position; and first means, associated with said holding means, for actuating said front pivotal closure member from a closed position, at which said front opening is covered by said front pivotal closure member, to an open position, at which said front opening is open, in synchronism with movement of said holding means from said eject position to said lowered position, wherein said second member is composed of a plate portion and a recessed portion fixed to an edge of said plate portion, said recessed portion receiving said front pivotal closure member therein at said open position thereof.

2. A cassette loading mechanism as set forth in claim 1, wherein said sliding means comprises a stationary member fixed to a cabinet of said recording and/or reproducing apparatus, and a sliding member which is slidable on said stationary member in an essentially horizontal direction.

3. A cassette loading mechanism as set forth in claim 2, wherein said lifting means comprises an elongated linking member, one end of said linking member being pivotally connected to said sliding member and the other end thereof being pivotably connected to said holding means.

4. A cassette loading mechanism as set forth in claim 3, wherein said first means includes a horizontally projecting member fixed to said sliding member, said horizontally projecting member thrusting said front pivotal closure member upwards in synchronism with movement of said holding means from said eject position to said lowered position so as to allow said front pivotal closure member to open.

5. A cassette loading mechanism in a recording and/or reproducing apparatus for a magnetic tape cassette which has a front pivotal closure member openable for covering or exposing a front opening of said magnetic tape cassette, which cassette loading mechanism comprises:
- holding means for receiving and holding said magnetic tape cassette at a fixed position within a cassette receptacle defined therein, said holding means being movable between an eject position, at which said magnetic tape cassette can be inserted into and removed from said holding means, and a loaded position at which cassette loading is completed, said holding means comprising a first member, on which said magnetic tape cassette is supported, and a second member which covers the upper surface of said magnetic tape cassette, said second member being fixed to said first member to form said cassette receptacle between said first and second members;
- lifting means for causing said holding means and said magnetic tape cassette to move in unison in an essentially vertical direction between said eject position and a lowered position;
- sliding means for causing said holding means and said magnetic tape cassette to move in unison in an essentially horizontal direction between said lowered position and said loaded position; and
- first means, associated with said holding means, for actuating said front pivotal closure member from a closed position, at which said front opening is covered by said front pivotal closure member, to an open position, at which said front opening is open, in synchronism with movement of said holding means from said eject position to said lowered position,
- wherein said second member of said holding means is composed of front and rear plate portions and a recessed portion connected between said front and rear plate portions, said recessed portion receiving said front pivotal closure member therein at said open position thereof.

6. A cassette loading mechanism as set forth in claim 5, wherein said sliding means comprises a stationary member fixed to a cabinet of said recording and/or reproducing apparatus, and a sliding member which is slidable on said stationary member in an essentially horizontal direction.

7. A cassette loading mechanism as set forth in claim 6, wherein said cabinet includes an upper plate portion which extends horizontally and is arranged so as to overlap with said front plate portion at said loaded position of said holding means.

8. A cassette loading mechanism as set forth in claim 7, wherein said lifting means comprises an elongated linking member, one end of said linking member being pivotally connected to said sliding member and the other end thereof being pivotably connected to said holding member.

9. A cassette loading mechanism as set forth in claim 8, wherein said first means includes a horizontally projecting member fixed to said sliding member, said horizontally projecting member thrusting said front pivotal closure member upwards in synchronism with movement of said holding means from said eject position to said lowered position so as to allow said front pivotal closure member to open.

10. A cassette loading mechanism for loading a magnetic tape cassette, which has an openable front pivotal closure member covering a front opening of said magnetic tape cassette, in a recording and/or reproducing apparatus, said cassette loading mechanism comprising:
- holding means for receiving and holding said magnetic tape cassette within a cassette receptacle defined therein, said holding means being movable between a first position, at which said cassette receptacle is exposed for insertion and removal of said magnetic tape cassette, a second position vertically offset from said first position, and a third position horizontally offset from said second position and at which cassette loading is completed;
- first means, associated with said holding means, for driving said holding means between said first and second positions;
- second means, associated with said holding means, for driving said holding means between said second and third positions;
- third means, associated with said holding means, for allowing said front pivotal closure member to be moved from a closed position, at which said front opening is closed to be covered by said front pivotal closure member, to an open position, at which said front opening is open, in synchronism with movement of said holding means from said first position to second position; and
- fourth means, associated with said holding means, for covering said magnetic tape cassette and for receiving said front pivotal closure member at said open position thereof,
- wherein said holding means comprises a first member, on which said magnetic tape cassette is supported, and said fourth means comprises a second member fixed to said first member to form said cassette receptacle between said first and second members, said first and second members being moved in unison between said first, second and third positions of said holding means, and said second member is formed with a recessed portion which receives said front pivotal closure member of said magnetic tape cassette at said open position thereof.

11. A cassette loading mechanism as set forth in claim 10, wherein said second means comprises a stationary member fixed to a cabinet of said recording and/or reproducing apparatus, and a sliding member which is slidable on said stationary member in an essentially horizontal direction.

12. A cassette loading mechanism as set forth in claim 11, wherein said first means comprises an elongated linking member, one end of said linking member being pivotably connected to said sliding member and the other end thereof being pivotably connected to said holding means.

13. A cassette loading mechanism as set forth in claim 12, wherein said third means includes a horizontally projecting member fixed to said sliding member, said horizontally projecting member allowing an edge of said front pivotal closure member to move upwards in synchronism with movement of said holding means from said first position to said second position so as to make said front pivotal closure member open.

14. A cassette loading mechanism in a recording and/or reproducing apparatus for a magnetic tape cassette which has a front pivotal closure member openable for covering or exposing a front opening of said magnetic tape cassette, which cassette loading mechanism comprises:
holding means for receiving and holding said magnetic tape cassette, said holding means being movable between an eject position, at which said magnetic tape cassette can be inserted into and removed from said holding means, and a loaded position at which cassette loading is completed, said holding means comprising a cover member which covers the upper surface of said magnetic tape cassette;
means for causing said holding means and said magnetic tape cassette to move between said eject position and an intermediate position and, in an essentially horizontal direction, between said intermediate position and said loaded position; and
first means, associated with said holding means, for actuating said front pivotal closure member from a closed position, at which said front opening is covered by said front pivotal closure member, to an open position, at which said front opening is open, in synchronism with movement of said holding means from said eject position to said intermediate position,
wherein said cover member is composed of a plate portion and a recessed portion adjacent to said plate portion, said recessed portion receiving said front pivotal closure member therein when said closure member is in its open position.

15. A cassette loading mechanism for loading a magnetic tape cassette, which has an openable front pivotal closure member covering a front opening of said magnetic tape cassette, in a recording and/or reproducing apparatus, said cassette loading mechanism comprising:
holding means for receiving and holding said magnetic tape cassette, said holding means being movable between a first position, at which said cassette receptacle is exposed for insertion and removal of said magnetic tape cassette, a second position vertically offset from said first position, and a third position horizontally offset from said second position and at which cassette loading is completed;
first means, associated with said holding means, for driving said holding means between said first and second positions;
second means, associated with said holding means, for driving said holding means between said second and third positions;
third means, associated with said holding means, for allowing said front pivotal closure member to be moved from a closed position, at which said front opening is closed by said front pivotal closure member, to an open position, at which said front opening is open, in synchronism with movement of said holding means from said first position to second position; and
fourth means, associated with said holding means, for covering said magnetic tape cassette and for receiving said front pivotal closure member when said closure member is in its open position, wherein said fourth means comprises a cover member having a recessed portion which receives said front pivotal closure member of said magnetic tape cassette when said closure member is in its open position.

* * * * *